United States Patent [19]

Cook

[11] Patent Number: 4,695,126
[45] Date of Patent: Sep. 22, 1987

[54] METHOD AND APPARATUS FOR EFFECTING LIGHT ENERGY TRANSMISSION WITH LESSENED REFLECTION

[75] Inventor: John S. Cook, Rumson, N.J.

[73] Assignee: Dorran Photonics, Incorporated, Atlantic Highlands, N.J.

[21] Appl. No.: 700,458

[22] Filed: Feb. 11, 1985

[51] Int. Cl.⁴ ............................................. G02B 6/38
[52] U.S. Cl. ..................... 350/96.21; 350/96.15; 350/96.20
[58] Field of Search ............... 350/96.15, 96.20, 96.21

[56] References Cited

U.S. PATENT DOCUMENTS

| | | | |
|---|---|---|---|
| 3,416,089 | 12/1968 | Koester et al. | 330/4.3 |
| 3,421,097 | 1/1969 | Koester et al. | 330/4.3 |
| 3,445,785 | 5/1969 | Koester et al. | 372/6 |
| 3,949,315 | 4/1976 | Zeidler | 330/4.3 |
| 3,970,360 | 7/1976 | Kersten et al. | 350/96.12 |
| 4,314,740 | 2/1982 | Bickel | 350/96.15 |
| 4,423,922 | 1/1984 | Porter | 350/96.20 X |
| 4,573,760 | 3/1986 | Fan et al. | 350/96.21 |
| 4,615,581 | 10/1986 | Morimoto | 350/96.21 |

FOREIGN PATENT DOCUMENTS

| | | | |
|---|---|---|---|
| 3149616 | 7/1983 | Fed. Rep. of Germany | 350/96.15 |
| 3217611 | 11/1983 | Fed. Rep. of Germany | 350/96.15 |
| 0152212 | 9/1983 | Japan | 350/96.20 |
| 0038707 | 3/1984 | Japan | 350/96.20 |

*Primary Examiner*—John Lee
*Attorney, Agent, or Firm*—Robin, Blecker & Daley

[57] ABSTRACT

An optical fiber assembly adapted for diminished back reflection along the fiber longitudinal axis includes a housing having a passage between end openings for residence of an opticle fiber. The passage is inclined with respect to an output energy axis and the fiber has its end face intersected by the output axis and prepared at an acute angle with respect to its longitudinal axis.

19 Claims, 8 Drawing Figures

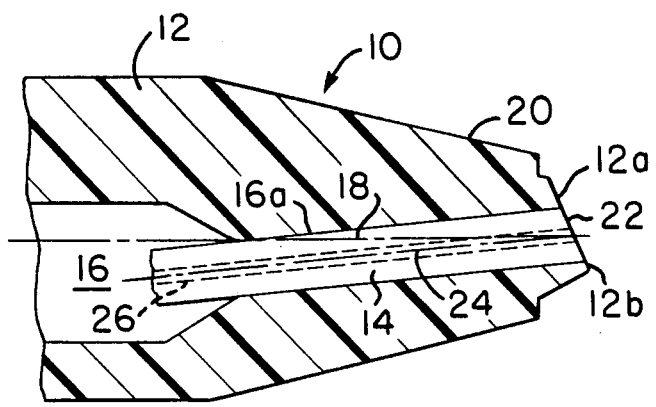
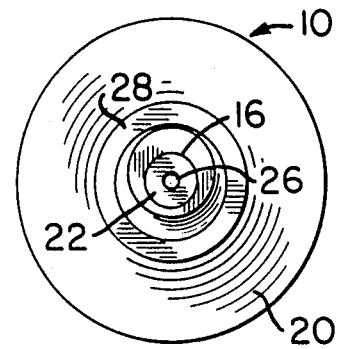
FIG. 1  FIG. 2
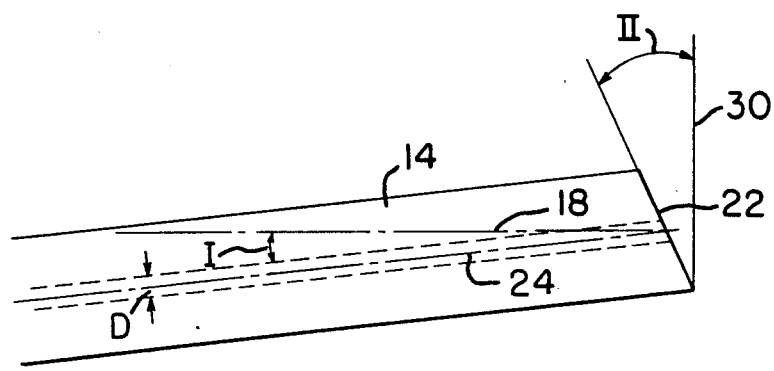
FIG. 3

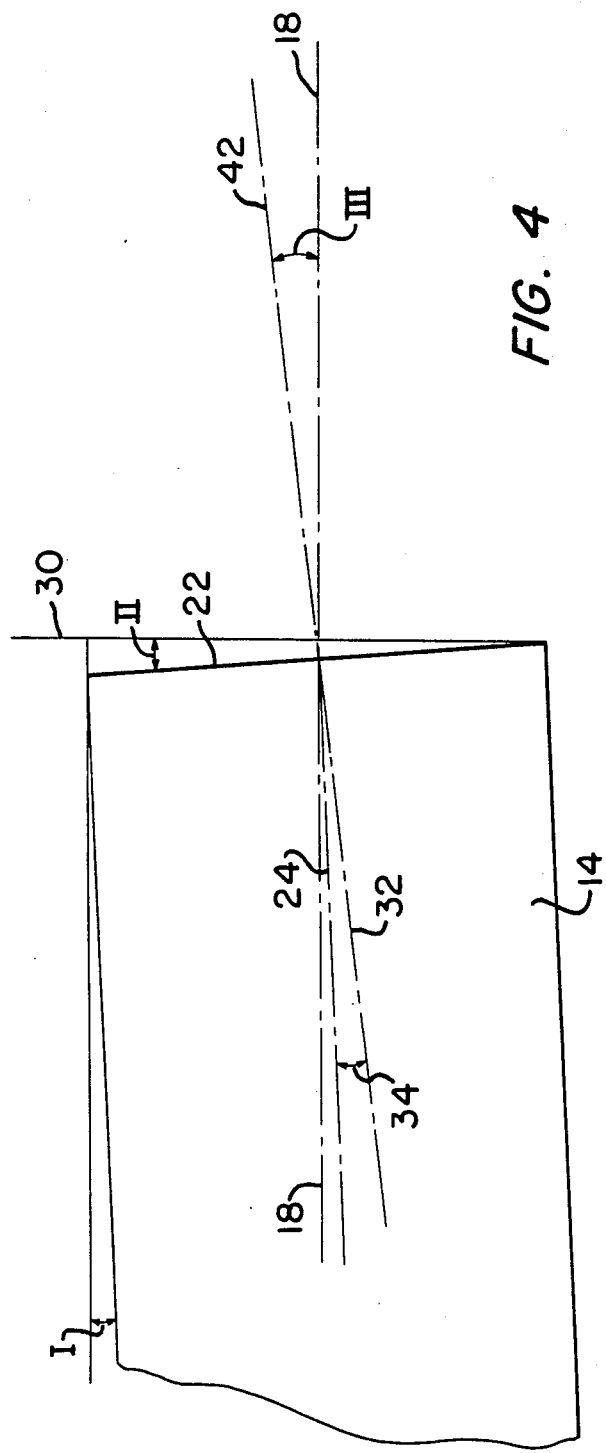
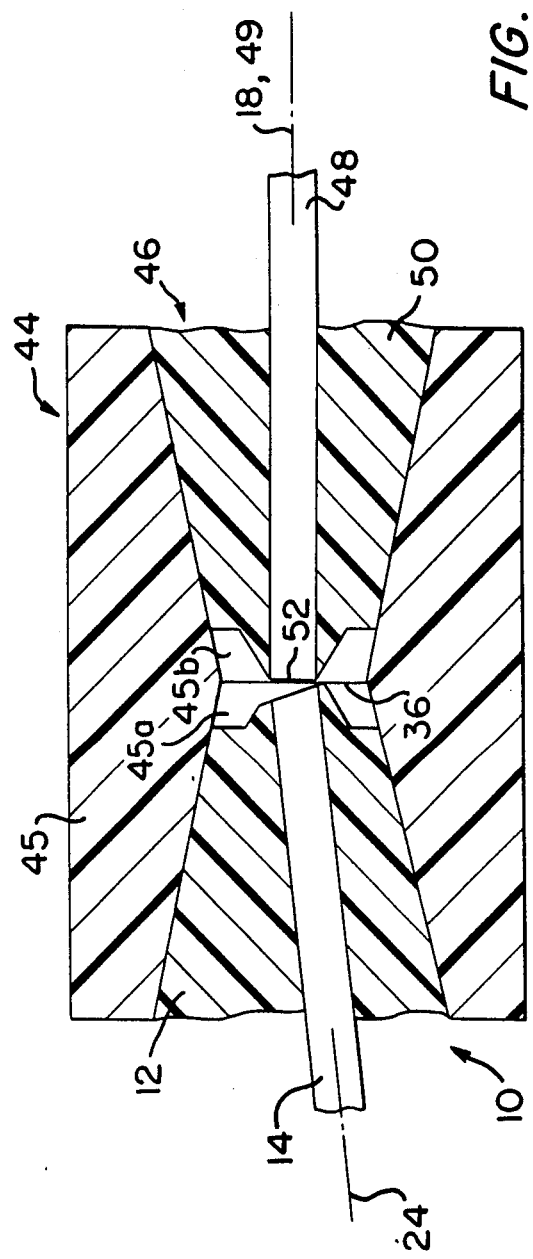
FIG. 4
FIG. 5

METHOD AND APPARATUS FOR EFFECTING LIGHT ENERGY TRANSMISSION WITH LESSENED REFLECTION

FIELD OF THE INVENTION

This invention relates generally to light energy transmission and pertains more particularly to methods and apparatus for light energy transmission with lessening of energy reflections adversely affecting transmission.

BACKGROUND OF THE INVENTION

In the transmission of light energy, numerous instances arise which call for a lessening, if not an elimination, of back reflection of transmitted energy along the transmission axis, for example, from energy coupling interfaces. Such reflections of energy into the energy output axis of a laser, as may arise at the coupling interface of the laser output fiber and another fiber, can intrude substantially upon the intended laser output energy and performance.

Energy reflections at a coupling interface between fiber ends can be eliminated by: (1) bringing the light-carrying fiber cores into physical contact; (2) introducing optical matching fluid or gel between the fibers; or (3) optically "coating" non-contacting fiber ends. Each of these techniques carries serious disadvantages in the manufacture and/or use of practical optical fiber couplers.

Predictability and consistency in such optical fiber connector performance is paramount to overall system design. While limited connector loss of constant measure is tolerable in system design, connector abberations due to variations in reflectivity of transmitted energy back along the energy transmission axis, for instance, back along the laser output fiber above, are not tolerable to the system designer.

In applicant's view, the present state of the art in the area under discussion falls short of the current industry requirements.

SUMMARY OF THE INVENTION

The present invention has as its primary object the provision of optical connectors employing non-contacting fibers but exhibiting lessened energy reflection characteristics.

In a more particular objective, the invention looks to the provision of connectors having essentially constant low loss and low reflectivity characteristics.

In attaining the foregoing and other objects, the invention provides method and apparatus for light energy transmission in which a housing has a central axis aligned with a desired output energy axis. A passage extends through the housing at a preselected first angle with respect to the housing central axis. An optical fiber is resident in the passage and has an end face finished at a preselected second angle with respect to the fiber longitudinal axis. The first and second angles are selected for purposes of both eliminating reflection along the length of the first fiber backwardly from its end face and providing efficient coupling of energy from the fiber end face along the energy output axis.

The foregoing and other objects of the invention will be further understood from the following detailed description of methods and apparatus in accordance with the invention and from the drawings in which like reference numerals identify like parts throughout.

DESCRIPTION OF THE DRAWINGS

FIG. 1 is a central sectional elevation of an optical fiber assembly in accordance with the invention, the optical fiber being shown unsectioned.

FIG. 2 is a right side elevation of the FIG. 1 assembly.

FIG. 3 is a schematic illustration on an enlarged scale of the FIG. 1 optical fiber in relation to its parent housing.

FIG. 4 is a further enlarged illustrative partial view of the FIG. 1 assembly.

FIG. 5 is a central sectional view of a first connector embodiment in accordance with the invention.

DESCRIPTION OF PREFERRED EMBODIMENTS AND PRACTICES

Figure 6:
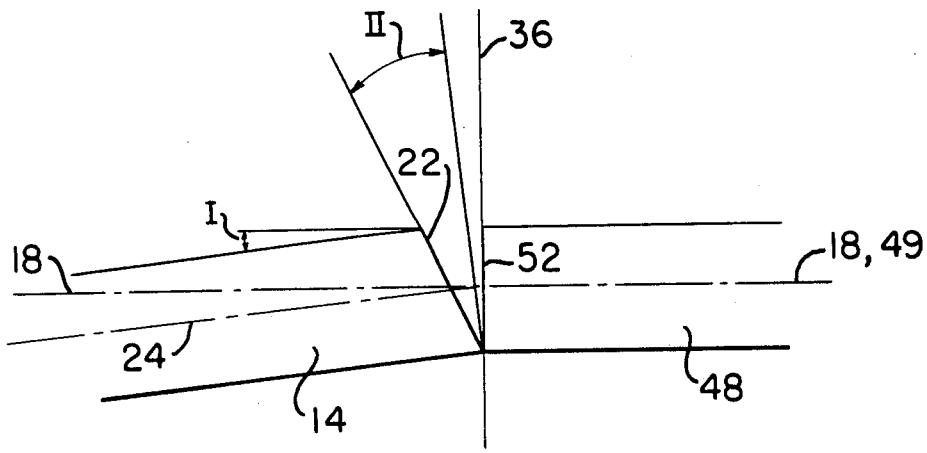
FIG. 6 is a view illustrative of the interrelationship of the mated fibers of the FIG. 5 embodiment.

Referring to FIGS. 1 and 2, optical fiber assembly 10 includes a housing or plug 12 having fiber 14, with light-carrying central core 26, resident in housing passage 16 along housing central axis 18. Housing 12 includes an end portion bounded by a frustro-conical surface 20 and the portion of passage 16 in such housing end portion is at an acute angle inclination to axis 18. Fiber 14 includes an end face 22 which is inclined with respect to the fiber longitudinal central axis 24. Housing 12 has surface extents 12a and 12b adjacent fiber end face 22 and likewise inclined with respect to the fiber longitudinal axis.

Turning to FIG. 3, fiber 14, having core diameter D, is polished from its customary transverse circular end face 30 to form end face 22. Fiber 14 is inclined with respect to housing axis 18 by a first acute angle I. End face 22 is at second acute angle II with respect to surface 30, normal to fiber axis 24. Practice in accordance with the invention will now be discussed with respect to FIG. 4, which is a more exacting representation of activity under the invention than the other views, which are intended in a general illustrative sense.

The practice of FIG. 4 both diminishes back reflections and conforms energy coupling to an output energy transmission axis aligned with the axis 18 of fiber assembly 10 of FIG. 1. In brief summary of the FIG. 4 practice, applicant governs angles I, II and III (the angle of refraction of energy issuing from end face 22 into ambient external medium), with attendant appreciation of the respective refractive indices of fiber 14 and the medium external to fiber end face 22, to achieve this result. While energy loss is to be experienced in the connection due to reflection from end face 22, dissipation of the reflected energy in the connection if far more significant to applicant. Thus, in his view, the industry is far better served by connectors having known and consistent energy loss and low reflectivity characteristics than connectors exhibiting higher coupling efficiency but having other practical disadvantages.

The practice of FIG. 4, from one perspective, involves the finding of angle I to thereby provide an acute angular intersection of fiber axis 24 and the output transmission axis 18. Angle II is selected to provide a non-orthogonality as between the plane of fiber end face 22 and fiber axis 24. In particular, taking a single-mode fiber, angle II should be about equal to or greater than 0.6 $\lambda_O$, divided by D times $n_F$, where $\lambda_O$ is the free space wavelength of light propagating in the fiber, $n_F$ is the refractive index of the fiber and D is the diameter of the fiber light-guiding core measured in the same units as the free space wavelength of the propagating fiber. The selection of this angle determines angle III, which results therefrom and the physical refraction parameters at hand.

Taking a particular example, angle II may be about three and six-tenths (3.6) degrees. From known light refraction principles, Equation (1) below applies:

$$\text{Sin III/Sin II} = n_F/n_M \qquad (1)$$

where $n_F$ is the refractive index of fiber 14 and $n_M$ is the refractive index of the medium external to fiber end face 22. For a typical fiber, $n_F$ is about one and one-half (1.5). Where the medium is air, $n_M$ is approximately unity (1.0). For the small angles under discussion, the sine is equal to the angle. Angle III then is $n_F$ times angle III, or about five and four tenths (5.4) degrees in the example under discussion. Coupling along transmission axis 18 is thus achieved where angle I is about one and eight tenths (1.8) degrees. More generally, in the example, the sum of angles I and II is equal to angle III.

In a further statement of the practice of FIG. 4, one may commence with the selection of desired reflection reduction, as by outset selection of angle II. Selection is then made jointly of angles I and III to achieve transmission along output axis 18.

As respects relections leftwardly from end face 22, same are deflected from the fiber longitudinal axis 24 by angle 34 to harmless axis 32. In the above example, angle 34 is about seven and two tenths (7.2) degrees (twice angle II). Accordingly, the reflected wave will not send significant signal back along the fiber core.

Turning to FIG. 5, connector 44 includes sleeve 45 configured internally with frustro-conical surfaces 45a and 45b adapted to seat optical fiber assembly 10 of FIGS. 1–2 and a second optical fiber assembly 46, the latter including fiber 48 and housing or plug 50 being of conventional structure i.e., wherein fiber end face 52 is of circular cross-section transverse to the longitudinal axis of fiber 48 and registers with coupling interface 36. In this embodiment, diminished energy reflection from end face 52 into fiber 14 occurs along axis 24 thereof than would apply in the case of mated assemblies both configured as assembly 46, the latter case being that found in current commericial practice. The improvement thus provided by the FIG. 5 practice is accomplished, based on the inclination of end face 22 of fiber 14 to its longitudinal axis and the inclination of the fiber itself to the energy output axis. The interrelationship of components is shown in enlarged fashion in FIG. 6, wherein the longitudinal axis 49 of fiber 48 is coincident with output axis 18 of fiber 14.

Figure 7:
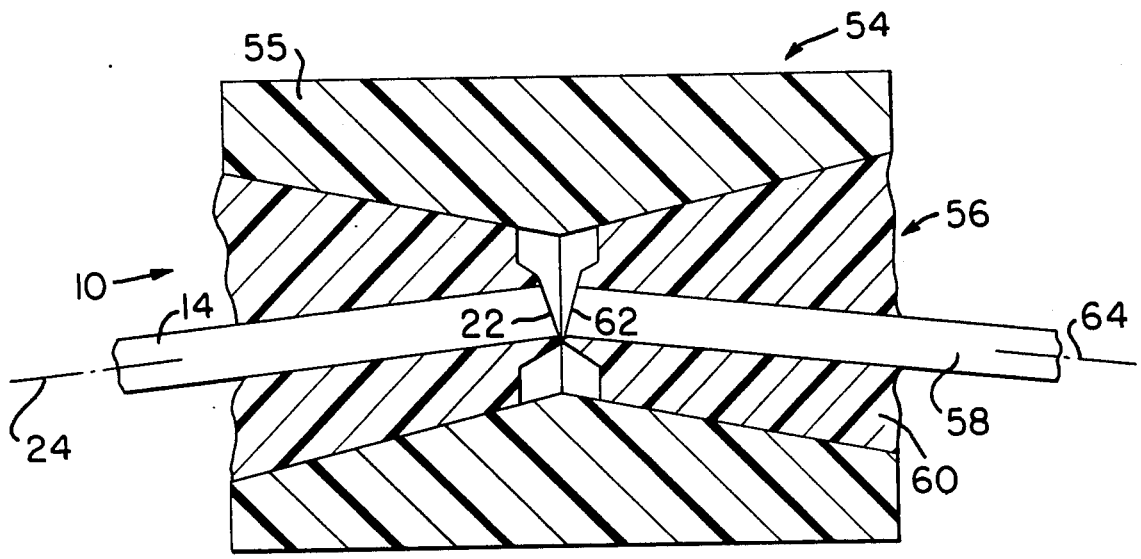
FIG. 7 is a central sectional view of a second connector embodiment in accordance with the invention.
Figure 8:
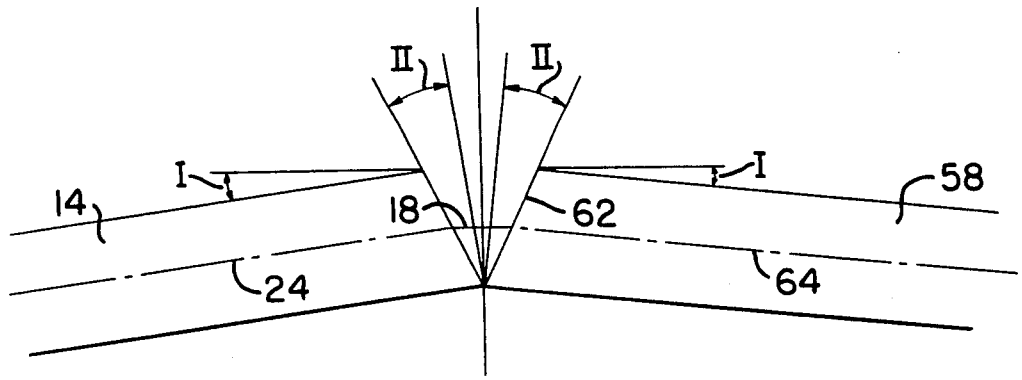
FIG. 8 is a view illustrative of the interrelationship of the mated fibers of the FIG. 7 embodiment.

Referring now to FIG. 7, a particularly preferred embodiment of the invention in its connector aspect is shown, wherein reflections along fiber axis 24 are further diminished from that obtaining in the FIG. 5 embodiment. Here, connector 54 includes a sleeve 55 which seats fiber assembly 10 and a fiber assembly 56 which is configured in the fashion of assembly 10, i.e., including fiber 58 seated in housing 60 in like inclined relation to that of fiber 14 of assembly 10 and having chamfered end face 62, which is inclined to the longitudinal axis 64 of fiber 58 at common angle with the inclination of end face 22 to the longitudinal axis 24 of fiber 14. Referring to FIG. 8, the geometric relationship of fibers 14 and 58 is shown, whereby they share in common the energy transmission axis 18.

While the invention has been illustrated with the entirety of housing passage 16 resident in the end portion of plug 12 of FIG. 1 inclined to the transmission axis, it is to be appreciated that the invention may be practiced and the results thereof enjoyed by disposing but a portion of the passage and resident fiber at such inclination. Thus, end extent of the fiber inclusive of its end face 22 may be at the inclination of angle I and the remainder of the fiber may be resident otherwise in the housing.

Further, it will be evident that the invention may be practiced with cylindrical fiber-containing ferrules in parent sleeve structure having a cylindrical bore for receivng the ferrules. The invention is also readily usable with multimode fibers, as will be understood by those skilled in the art, based on the foregoing expression of the invention for single-mode fibers.

The foregoing and other changes in practice and modifications to structure and configuration may be introduced without departing from the invention. Accordingly, it is to be appreciated that the particularly disclosed preferred embodiments and practices are intended in an illustrative and not in a limiting sense. The true spirit and scope of the invention is set forth in the ensuing claims.

I claim:
1. An optical fiber assembly, comprising:
   (a) a housing defining a passage therethrough for residence of an optical fiber therein and having a central axis constituting an energy output axis, at least a portion of said passage adjacent said energy output axis extending along an axis in acute first angle intersecting relation to said energy output axis; and
   (b) an elongate optical fiber resident in said housing passage and accordingly having disposition at said acute first angle to said energy output axis in said passage portion, said fiber defining an end face juxtaposed with said energy output axis, said fiber end face being at an acute second angle to the fiber longitudinal axis and being acutely inclined with respect to said energy output axis.

2. The invention claimed in claim 1 wherein said housing includes an end portion having exterior frustro-conical surface and wherein the entirety of said passage in said end portion extends alon an axis in said acute first angle intersecting relation to said energy output axis.

3. The invention claimed in claim 1 wherein said housing end portion is symmetrical about said central axis.

4. The invention claimed in claim 1 wherein said housing includes exterior surface adjacent said fiber end face and at said acute second angle.

5. The invention claimed in claim 1 wherein said second angle exceeds said first angle.

6. The invention claimed in claim 1 wherein the sum of said first and second angles is equal to the angle of refraction of energy issuing from said end face into ambient medium external to said fiber.

7. An optical fiber assembly, comprising;
   (a) a housing having a central axis constituting an energy output axis and defining a passage therethrough at least in part at a preselected acute first intersecting angle with respect to said energy output axis; and (b) an elongate optical fiber resident in said passage part and having an end face intersected by said energy output axis and at a preselected second acute angle with respect to the longitudinal axis of said fiber, said fiber end face being acutely inclined with respect to said energy output axis.

8. An optical fiber assembly, comprising:
(a) a housing having an energy output axis and defining a passage therethrough at least in part at a preselected first intersecting angle with respect to said energy output axis; and
(b) an elongate optical fiber resident in said passage part and having an end face intersected by said energy output axis and at a preselected second angle with respect to the longitudinal axis of said fiber, the sum of said first and second angles being the angle of refraction of energy issuing from said end face into ambient medium external to said fiber.

9. In an optical fiber connector, in combination:
(a) a first housing defining a passage therethrough for residence of an optical fiber therein and having a central axis constituting an energy output axis, at least a portion of said passage adjacent said energy output axis extending along an axis in acute first angle intersecting relation to said energy output axis;
(b) a first elongate optical fiber resident in said first housing passage and accordingly having disposition at said acute first angle to said energy output axis in said passage portion, said fiber defining an end face juxtaposed with said energy output axis, said fiber end face being at an acute second angle to the fiber longitudinal axis and being acutely inclined with respect to said energy output axis;
(c) a second housing defining a passage therethrough for residence of an optical fiber therein, said second housing having a central axis axially aligned with said first housing energy output axis; and
(d) a second elongate optical fiber resident in said second housing passage and defining a fiber end face juxtaposed with a said first housing energy output axis and in energy exchanging relation with said first fiber end face.

10. The invention claimed in claim 9 wherein the entirety of said second housing passage extends in alignment with said first housing energy output axis.

11. The invention claimed in claim 9 wherein at least a portion of said second housing passage extends along an axis in acute third angle intersecting relation to said first housing energy output axis.

12. The invention claimed in claim 11 wherein said second fiber defines an end face in acute fourth angle relation to the longitudinal axis of said second fiber.

13. The invention claimed in claim 12 wherein said first housing includes an end portion having exterior frustro-conical surface, the entirety of said first fiber passage being in said acute first angle intersecting relation to said first housing energy output axis and wherein said second housing includes an end portion having exterior frustro-conical surface, the entirety of said second housing passage being in said acute third angle intersecting relation to said first housing energy output axis.

14. The invention claimed in claim 12 wherein said third angle is equal to said first angle and wherein said fourth angle is equal to said second angle.

15. The invention claimed in claim 14 wherein said second angle exceeds said first angle.

16. The invention in claim 15 wherein the sum of said first and second angles is equal to the angle of refraction of energy issuing from said first end face into ambient medium external to said first fiber.

17. The invention claimed in claim 12 wherein said first and second housing end portions are each symmetrical about central axes.

18. A method for light energy transmission by use of an optical fiber support housing having a central axis defining a light energy transmission axis, comprising the steps of:
(a) preparing an elongate optical fiber with an end face at an acute angle with respect to the fiber longitudinal axis; and
(b) disposing at least a portion of such prepared fiber in intersecting relation to said light energy transmission axis at an acute angle, said steps (a) and (b) being practiced further to dispose said fiber end face in acutely inclined relation to said light energy transmission axis, said angles being selected both to minimize light energy reflection longitudinally in said fiber from said end face thereof and to effect energy coupling along said predetermined light energy transmission axis.

19. The method claimed in claim 18 wherein said acute angles are selected such that the sum thereof is equal to the angle of refraction of energy issuing from said end face into ambient medium external to said fiber.

* * * * *